United States Patent
Hyun (10) Patent No.: US 10,617,102 B2
(45) Date of Patent: Apr. 14, 2020

(54) FISHING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/032,559

(22) Filed: Jul. 11, 2018

(65) Prior Publication Data

US 2019/0045767 A1 Feb. 14, 2019

(30) Foreign Application Priority Data

Aug. 10, 2017 (KR) .......... 10-2017-0101723

(51) Int. Cl.
*A01K 89/01* (2006.01)
*A01K 89/015* (2006.01)

(52) U.S. Cl.
CPC .............. *A01K 89/01931* (2015.05)

(58) Field of Classification Search
CPC ........ A01K 89/01922; A01K 89/01923; A01K 89/01931
See application file for complete search history.

(56) References Cited

U.S. PATENT DOCUMENTS

| | | | | |
|---|---|---|---|---|
| 7,789,336 | B1* | 9/2010 | Nakagawa | A01K 89/01931 242/322 |
| 8,006,957 | B2* | 8/2011 | Nakagawa | A01K 89/01931 254/322 |
| 9,439,408 | B2* | 9/2016 | Takechi | A01K 89/015 |
| 9,763,434 | B2* | 9/2017 | Baldwin | A01K 89/01922 |
| 2004/0079822 | A1* | 4/2004 | Kawasaki | A01K 89/01931 242/322 |
| 2013/0320125 | A1* | 12/2013 | Hyun | A01K 89/01923 242/312 |

FOREIGN PATENT DOCUMENTS

| | | |
|---|---|---|
| JP | 2006246776 | 9/2006 |
| JP | 2013252134 | 12/2013 |
| KR | 101534273 | 7/2015 |
| KR | 20170084999 | 7/2017 |

* cited by examiner

*Primary Examiner* — Emmanuel M Marcelo
(74) *Attorney, Agent, or Firm* — Cantor Colburn LLP (57) ABSTRACT

Provided is a fishing reel having a hidden lock lever for a palm-side first side cover. The fishing reel has a hidden lock lever for a palm-side first side cover in which an operating portion of the lock lever protrudes out of the first side cover when the first side cover is unlocked so that a user can immediately know that the first side cover is unlocked when holding the fishing reel, and the operating portion of the lock lever is hidden inside the first side cover so that a user can fish with the fishing reel in his/her hands without inconvenience.

4 Claims, 7 Drawing Sheets

FISHING REEL

BACKGROUND OF THE INVENTION

Field of the Invention

The present invention relates to a fishing reel having a hidden lock lever for a palm-side first side cover. More particularly, the present invention relates to a fishing reel having a hidden lock lever for a palm-side first side cover in which an operating member of the lock lever protrudes out of the first side cover when the first side cover is unlocked so that a user can immediately know that the first side cover is unlocked when holding the fishing reel, and the operating member of the lock lever is hidden inside the first side cover so that a user can fish with the fishing reel in his/her hands without inconvenience.

Description of the Related Art

In general, bait casting reels (hereafter, generally referred to as fishing reels) are different only in that the operation structure of a brake dial or a tension nut according to the braking method of a spool, and they include a frame with a spool mounted thereon, a palm-side first side cover, a gear-side second side cover coupled to a second side of the frame, and a handle disposed on the second side cover.

In these fishing reels, the second side cover that is relatively less frequently opened/closed is firmly fastened to the frame for example by bolting.

Users may open, separate, and recombine the first side cover that is relatively frequently opened/closed while fishing and then keep fishing under various environments, for example, in the cases of separating a spool to repair the fishing reel or regulating a brake shoe of a centrifugal brake type to prevent backlash, when the user fishes not only on a flat ground area, but a slope such as a rock.

Various detachable structures for opening/closing a first side cover are applied to fishing reels. As in Korean Patent No. 10-1534273 (Patent Document 1), there is a type of locking and unlocking a first side cover using a locking lever coupled to the first side cover.

Patent Document 1 includes a locking lever that locks or unlocks a cover by rotating a spool cover inside the cover as a part for locking a first side cover, in which the locking lever is always jutted and exposed regardless of the cover is locked or unlocked. Accordingly, a user is interfered with by the locking lever when holding the fishing reel, so he/she cannot stably and conveniently hold the fishing reel. Further, there is a possibility that the locking lever is unexpectedly rotated during fishing, so the first side cover is separated and parts are correspondingly damaged and lost.

In order to solve this problem, there is Korean Patent Application Publication No. 10-2017-0084999 (Patent Document 2).

According to Patent Document 2, a hole is formed through a side of a side plate corresponding to a first side cover and an operating member of a cover opening/closing the side plate with respect to a frame is disposed inside the hole and exposed therein without jutting out of the side plate, so a user can operate the operating member by inserting a finger into the hole, if necessary.

According to Patent Document 2, the problem with Patent Document 1 can be solved, but a user can intuitionally check or recognize locking of the side plate. Accordingly, when a user separates and recombines the side plate and fishes without locking the side plate by mistake or misjudgment, the side plate may be separated.

That is, in common fishing reels, the first side cover is temporarily coupled to the frame even if it is unlocked, so users restart fishing without locking the first side cover with the operating member in Patent Document 2 in some cases and the first side cover is frequently separated from the frame during fishing.

SUMMARY OF THE INVENTION

The present invention has been made in an effort to solve the problems and an object of the present invention is to provide a fishing reel having a hidden lock lever for a palm-side first side cover, the fishing reel preventing a user from fishing with the first side cover temporarily coupled to a frame by allowing the user to intuitionally check and recognize that the first side cover is locked or unlocked without specific attention and the fishing reel enabling a user to more stably and conveniently hold the fishing reel and fish without deteriorating the specific shape of the fishing reel with the first side cover locked.

In order to solve the problems, a fishing reel according to an aspect of the present disclosure includes: a frame having a spool; a first side cover coupled to a palm-side mount of the frame and having a first end fitted therein of a shaft of the spool; a second side cover coupled to a gear-side mount of the frame and having a second end fitted therein of the shaft of the spool; and a lock lever locking and unlocking the first side cover such that the first side cover can be attached to and detached from the frame, in which the lock lever has an operating member that protrudes out of the first side cover when the first side cover is unlocked.

In order to solve the problems, a fishing reel according to another aspect of the present disclosure includes: a frame having a spool; a first side cover coupled to a palm-side mount of the frame and having a first end fitted therein of a shaft of the spool; a second side cover coupled to a gear-side mount of the frame and having a second end fitted therein of the shaft of the spool; and a lock lever locking and unlocking the first side cover such that the first side cover can be attached to and detached from the frame, in which the lock lever has an operating member that is hidden inside the first side cover when the first side cover is locked.

A fishing reel according to another aspect of the present invention includes: a frame having a spool; a first side cover coupled to a palm-side mount of the frame and having a first end fitted therein of a shaft of the spool; a second side cover coupled to a gear-side mount of the frame and having a second end fitted therein of the shaft of the spool; and a lock lever locking and unlocking the first side cover such that the first side cover can be attached to and detached from the frame, in which the lock lever has an operating member composed of a protruding portion that protrudes out of the first side cover when the first side cover is unlocked and that hides inside the first side cover when the first side cover is locked, and an operating portion that operates the lock lever in locking and unlocking directions.

A fishing reel according to another aspect of the present invention includes: a frame having a spool; a first side cover coupled to a palm-side mount of the frame and having a first end fitted therein of a shaft of the spool; a second side cover coupled to a gear-side mount of the frame and having a second end fitted therein of the shaft of the spool; and a lock lever locking and unlocking the first side cover such that the first side cover can be attached to and detached from the frame, in which the lock lever has an operating member that protrudes out of and hides inside the first side cover by rotating coaxially with the shaft of the spool, and the operating member protrudes out of the first side cover when the first side cover is unlocked, and hides inside the first side cover when the first side cover is locked.

According to the fishing reel having a hidden lock lever for a palm-side first side cover of the present invention, since the operating member of the lock lever protrudes out of the first side cover when the first side cover is unlocked and temporarily coupled to the frame, the operating member provides non-smooth feeling to a user holding the fishing reel by coming in contact with the hand of the user, so the user can immediately and intuitively recognize that the first side cover is unlocked. Therefore, it is possible to prevent a user from fishing with the first side cover temporarily coupled, whereby it is possible to prevent separation of the first side cover and correspondingly prevent parts from being damaged and lost.

Furthermore, since the operating member of the lock lever is hidden inside the first side cover when the first side cover is locked, comfort grip by the specific shape of the fishing reel is not deteriorated, so a user can fish with the fishing reel more conveniently and stably in his/her hand.

Furthermore, according to the fishing reel having a hidden lock lever for a palm-side first side cover of the present invention, since the operating member of the lock lever locks and unlocks the first side cover by protruding out of and hides inside the first side cover, the fishing reel is convenient to use.

Furthermore, since the operating member of the lock lever is rotated coaxially with the spool shaft, the internal locking structure of the lock lever is simplified. Accordingly, it is possible to more easily apply the lock lever to various fishing reels without specifically changing the design of the fishing reels, so productivity of fishing reels can be increased.

Furthermore, according to the fishing reel having a hidden lock lever for a palm-side first side cover of the present invention, since the fishing reel is designed in consideration of the positions of fingers holding the fishing reel, it is possible to more easily quickly operate the lock lever and recombine the first side cover after separating the first side cover.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention may be modified in various ways and implemented by various exemplary embodiments, so that aspect (or embodiments) will be described in detail. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. Singular forms are intended to include plural forms unless the context clearly indicates otherwise.

It will be further understood that the terms "comprises" or "includes" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from another constitutive element, but constitutive element should not be limited to a manufacturing order, and the terms described in the detailed description of the invention may not be consistent with those described in the claims.

Figure 1:
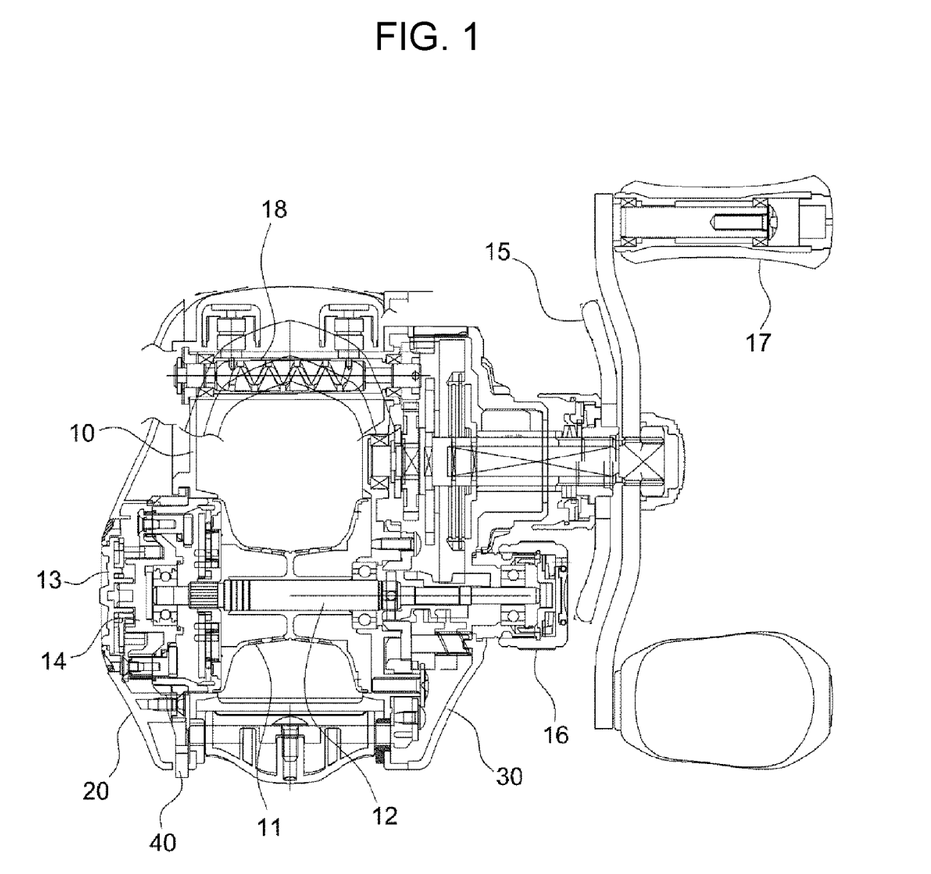
FIG. 1 is a plan view of a fishing reel according to the present invention.
Figure 2A:
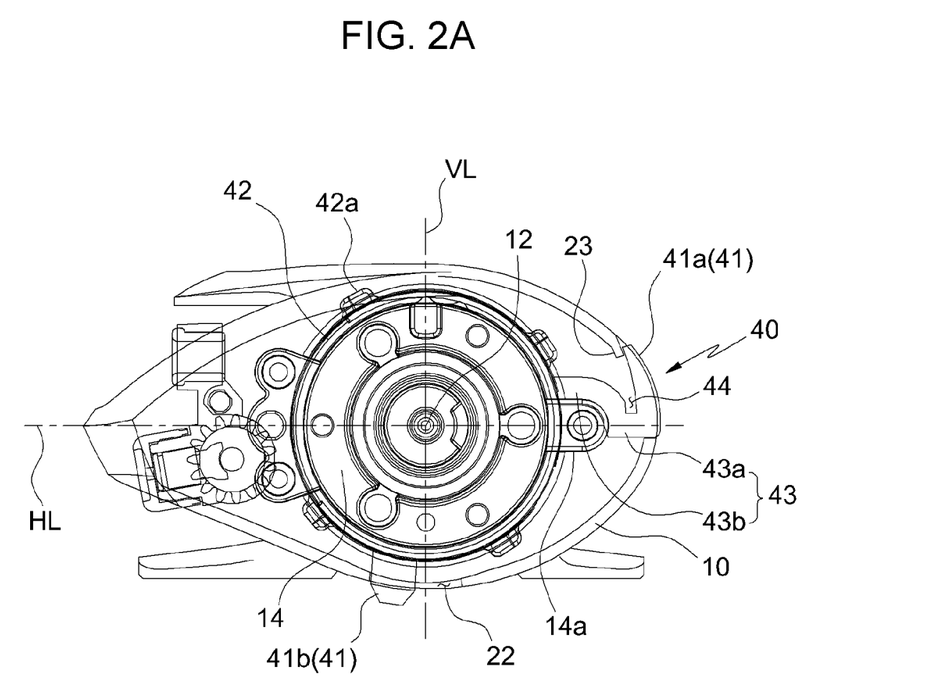
FIGS. 2A and 2B are side views showing a first embodiment of the present invention.
Figure 2B:
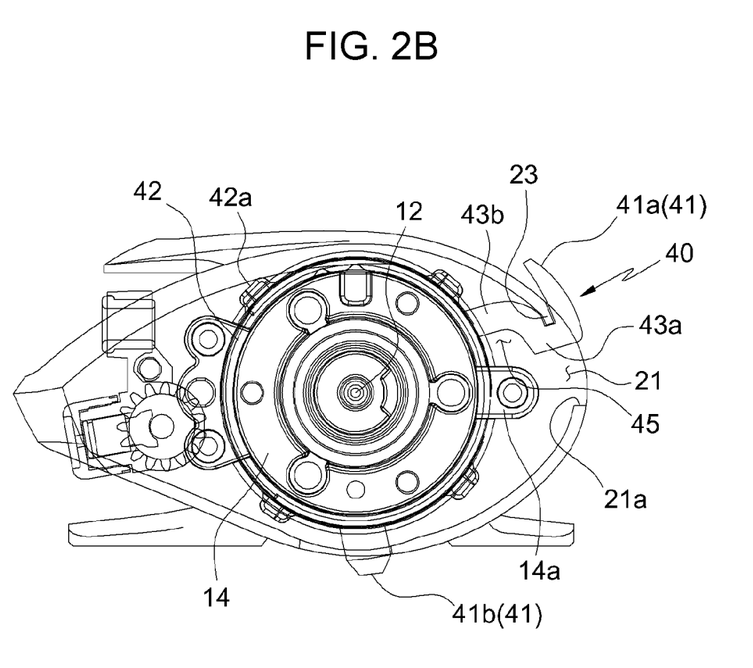

For convenience of the description of a fishing reel according to the present invention, when an approximate direction rather than a precise direction is specified with reference to FIGS. 1, 2A, and 2B, when seeing the front of a line guide 18 of a frame 10, a lower side is determined based on a direction to which gravity is applied, and up and down directions and right and left directions are determined based on the lower side. This standard may be also applied to the other drawings, and directions may be specified and described based on this standard unless the detailed description of the invention and the claims specially indicate otherwise.

Hereafter, a fishing reel having a hidden lock lever for a palm-side first side cover according to the present invention will be described with reference to the accompanying drawings.

The present invention relates to a fishing reel having a lock lever for locking/unlocking a palm-side first side cover. As shown in FIGS. 1 to 4B, the fishing reel includes: a frame 10 on which a spool 11 is mounted; a first side cover coupled to a palm-side mount of the frame 10 and having a first end fitted therein of a shaft 12 of the spool 11; a second side cover 30 coupled to a gear-side mount of the frame 10 and having a second end fitted therein of the shaft 12 of the spool 11; and a lock lever 40 locking and unlocking the first side cover 20 such that the first side cover 20 can be attached to and detached from the frame 10.

In detail, in the fishing reel of the present invention, the palm-side first side cover 20 and the gear-side second side cover 30 are respectively coupled to both outer sides of the frame 10, the shaft 12 are fitted in the first and second side covers 20 and 30 and mounted on the frame 10 such that the spool 11 on which a fishing line is wound can be rotated, various braking members 13 providing rotational braking force to the spool 11 and a spool cover 14 are retained inside the palm mount of the frame 10 by the first side cover 20, various parts including a drive gear for cooperation of the shaft 12 of the spool 11 and a handle 17 and for operation of a star drag 15 and a tension nut 16 are retained inside the gear-side mount of the frame by the second side cover 30, and the handle 17 is coupled through a rotary shaft outside the second side cover 30 to rotate with the spool 11.

The lock lever 40 locking and unlocking the first side cover 20 is disposed between the first side cover 20 and the palm-side mount of the frame 10. The lock lever 40 is coupled to the spool cover 14 disposed on the inner side of the first side cover 20, so it is attached to and detached from the frame 10 together with the first side frame 20.

Reference numerals '21' and '22' not stated above respectively indicate first and second holes through which a protrusion 41a and an operating portion 41b are exposed outside the first side cover 20.

The fishing reel may include all kinds of parts that can be applied to fishing reels and, particularly, bait casting reels well known in the art without interfering with the important configuration of the present invention to be described below.

The important point of the present invention is described with reference to the side views of a palm side shown in FIGS. 2A to 4B.

First, the lock lever 40 has an operating member 41 that protrudes out of the first side cover 20 when the first side cover 20 is unlocked.

The operating member 41 of the lock lever 40 is hidden in the first side cover 20 when the first side cover 20 is locked.

The operating member 41 of the lock lever 40 has: a protruding portion 41a that protrudes out of the first side cover 20 when the first side cover 20 is unlocked and that is hidden in the first side cover 20 when the first side cover 20 is locked; and an operating portion 41b operating the lock lever 40 in locking and unlocking directions.

Since the operating member 41 of the lock lever 40 protrudes out of and hides inside the first side cover 20 by rotating coaxially with the shaft 12 of the spool 11, the operating member 41 protrudes out of the first side cover 20 when the first side cover 20 is unlocked, and it hides inside the first side cover 20 when the first side cover 20 is locked.

Figure 4A:
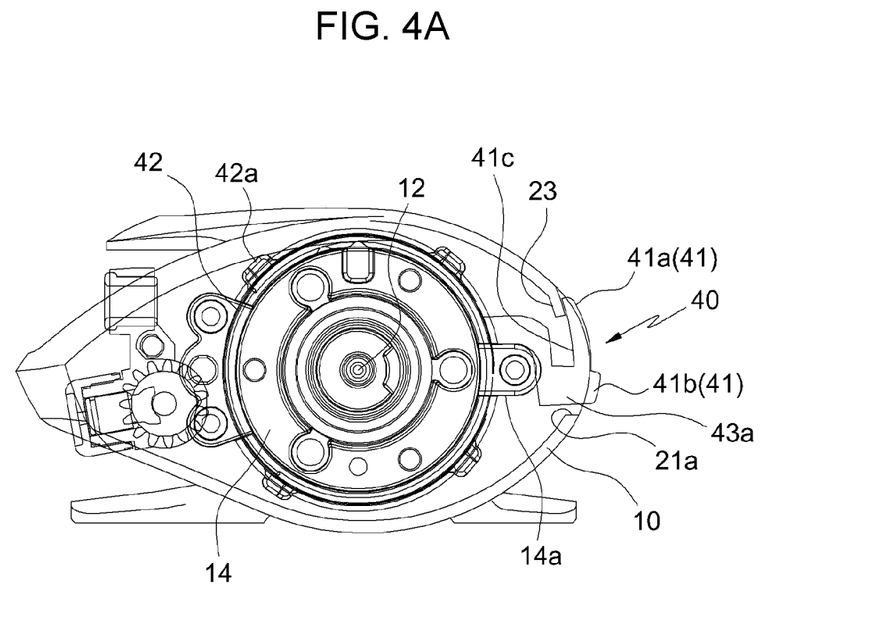
FIGS. 4A and 4B are side views showing a third embodiment of the present invention.
Figure 4B:
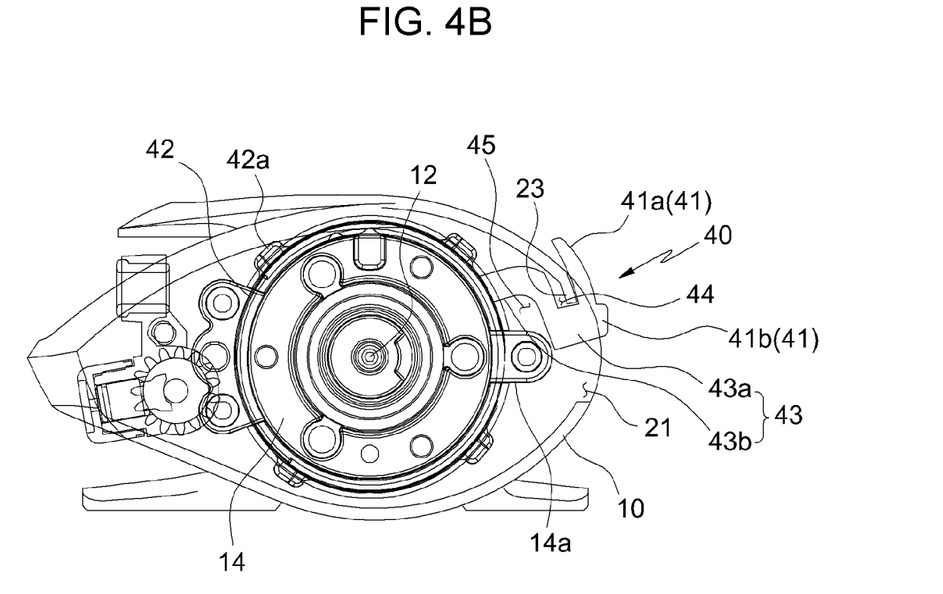

In detail, the operating member 41 is used to operate the lock lever 40 in the locking or unlocking direction, in which the protruding portion 41a and the operating portion 41b may be spaced apart from each other, as shown in FIGS. 2A and 2B, or they may be integrally connected to each other, as shown in FIGS. 4A and 4B.

Since the protruding portion 41a of the lock lever 40 protrudes out of and hides inside the first side cover 20, the first side cover 20 is locked and unlocked by the lock lever 40.

That is, the lock lever 40 is locked when the operating member 41 is operated in the locking direction, and the lock lever 40 is unlocked when the operating member 41 is operated in the unlocking direction.

When the operating member 41 is operated in the directions, the protruding portion 41a protrudes and hides through the first hole 21 of the first side cover 20. That is, the protruding portion 41a protrudes out of the first side cover 20 when the first side cover 20 is unlocked, and it hides inside the second side cover r30 when the first side cover 20 is locked.

The protruding portion 41a can be implemented in various ways, for example, it can be coupled through a separate operating shaft, depending on the detailed locking structure of the lock lever 40 that fixes the first side cover 20 to the palm-side mount of the frame 10 (e.g., the protrusion 41a is moved or rotated out of the first side cover 20 by a button or a pin when the lock lever 40 is unlocked). According to the present invention, the operating member 41 of the lock lever 40 has the protruding portion 41a that protrudes out of and hides inside the first side cover 20, thereby simplifying the internal structure.

In detail, as shown in FIGS. 2A to 4B, the lock lever 40 has a locking structure in which the locking lever 40 is connected to a ring 42 circumferentially covering the spool cover 14, so when the lock lever 40 is rotated forward/backward, the ring 42 is rotated forward/backward and a locking protrusion 42a formed on the outer side of the ring 42 is selectively locked into or unlocked out of locking grooves (not shown) of the frame 10.

In this case, as shown in FIGS. 2A and 2B, the operating member 41 may be composed of the protruding portion 41a and the operating portion 41b that protrude from the ring 42 and are spaced from and connected to each other at different angles around the ring 42, so the protruding portion 41a and/or the operating portion 41b can be used to rotate the lock lever 40 in the locking direction (clockwise in the figures) and the operating portion 41b can be used to rotate the lock lever 40 in the unlocking direction (counterclockwise in the figures).

Furthermore, as shown in FIGS. 3A to 4B, the operating member 41 may be composed of the protruding portion 41a and the operating portion 41b protruding from the protruding portion 41a, so it is possible to rotate the lock lever 40 in the unlocking direction using the operating portion 41b and to rotate the lock lever 40 in the locking direction using the protruding portion 41a or the operating portion 41b.

Furthermore, the operating member 41 may have only the protruding portion 41 without a specific operating portion (that is, the operating portion 41b in the first embodiment is removed). In this case, it is possible to rotate the lock lever 40 using a gap between the protruding portion 41a and the frame 10 to unlock the lock lever 40 and to rotate the lock lever 40 using the protruding portion 41a to lock the lock lever 40.

That is, the protruding portion 41a and the operating portion 41b may be separately formed to be spaced from each other on the ring 42 that is rotatably coupled, or the protruding portion 41a and the operating portion 41b may be integrated on the ring 42.

According to the present invention, when the operating member 41 is operated in the directions, the operating member 41 (in detail, the protruding portion 41a) protrudes and hides through the first hole 21 of the first side cover 20. That is, the protruding portion 41a protrudes out of the first side cover 20 when the first side cover 20 is unlocked, and it hides inside the second side cover r30 when the first side cover 20 is locked.

According to the fishing reel having this structure, when the lock lever 40 is not locked, that is, the lock lever 40 is not operated in the locking direction with the first side cover 20 temporarily coupled to the frame 10, inconvenient feeling is transmitted to a user holding the fishing reel by the operating member 41 (the protruding portion 41a) that has protruded, thereby inducing the user to immediately recognize that the first side cover 20 is unlocked and then lock the first side cover 20. Accordingly, it is possible to prevent the problem that a user fishes without locking the first side cover 20 by mistake or poor skill, whereby the first side cover 20 is separated.

Furthermore, when the first side cover 20 is locked, that is, the lock lever 40 has been operated in the locking direction, the operating member 41 is hidden inside the first side cover 20, so feeling that is different from the specific external shape of the fishing reel is not generated when a user holds the fishing reel. Accordingly, a user can fish with more conveniently and stably in his/her hands.

Furthermore, as described above, according to the present invention, since the operating member 41 is disposed on the outer side of the ring 42 surrounding the spool cover 14 (including the structure in which the protruding portion 41a and the operating portion 41b are spaced from each other) such that the operating member 41 protrudes and hides while rotating coaxially with the spool shaft 12, the fishing reel can be easily manufactured.

Furthermore, in four directions divided by a vertical line VL and a horizontal line HL passing through the axial center of the spool shaft 12, the operating member 41 (only the protruding portion 41a of the first embodiment) is disposed at the rear upper portion, so the operating member that has protruded is positioned over the horizontal line HL when the first side cover 20 is unlocked.

In the first embodiment, the operating portion 41b is positioned between the front lower portion and the rear lower portion, and in the second and third embodiments, when the first side cover 20 is locked, the operating portion 41b is positioned on or under the horizontal line HL.

According to this arrangement, when a user is a right-handed person, the protruding portion 41a that has protruded for unlocking is positioned to correspond to the thumb of the left hand of the user holding the fishing reel, so the user can immediately and intuitionally recognize that the first side cover 20 is temporarily coupled, but is not locked.

Further, the user can immediately operate the lock lever 40 by pushing the protruding portion 41a backward and downward with the left thumb after temporarily coupling the first side cover 20, which is convenient.

Furthermore, since the operating portion 41b is disposed at the lower portion of the fishing reel in the first embodiment, the other fingers holding the fishing reel do not come in contact with the operating portion 41b.

Further, in the second and third embodiments, the operating portion 41b is disposed completely at the rear portion of the fishing reel.

Accordingly, even if the operating portion 41b always juts out, it does not interfere with the user holding the fishing reel, so the user can more conveniently and stably hold and use the fishing reel.

In the second and third embodiments, the height of the operating portion 41b can be adjusted such that the protruding portion 41b slightly protrudes such that the end of a finger is locked, or the operating portion 41b may be formed at an angle. Further, the operating portion 41b may be removed, as described above.

The first side cover 20 is formed in an elliptical shape with the sides elongated forward and backward so that the protruding portion 41a protrudes out of the first side cover 20 when the lock lever 40 is operated in the unlocking direction.

The lock lever 40 has a bridge 43 having an outer end 43a connected to the protruding portion 41a and an inner end 43b connected to the ring 42.

The protruding portion 41 smoothly curved upward and forward from the outer end 43a of the bridge 43 to have a curvature the same as that the first side cover 20 and a shape corresponding to the first hole 21.

The lock lever 40 having this structure is rotated around the spool shaft 12. Accordingly, when the lock lever 40 is locked, the protruding portion 41a closes the first hole 21 inside the first hole 21 and forms a portion of the outer side of the first side cover 20 without protruding. Further, when the lock lever 40 is unlocked, the protruding portion 41a is rotated and naturally protrudes out of the first side cover 20.

Furthermore, the outer end 43a of the bridge 43 is biased more than the inner end 43b in the locking direction of the lock lever 40, so the outer end 43a and the inner end 43b are arranged in parallel not in the same line (that is, the outer end 43a and the inner end 43b are connected to each other at different angles from the rotational center of the lock lever 40 (the spool shaft 12)), so a locking portion 45 is formed between the bottoms of the outer end 43a and the inner end 43b.

When the lock lever 40 is locked, a bolt coupling portion 14a fixing the spool cover 13 is locked inside the locking portion 45, so the lock lever 40 is stopped and supported.

Figure 3A:
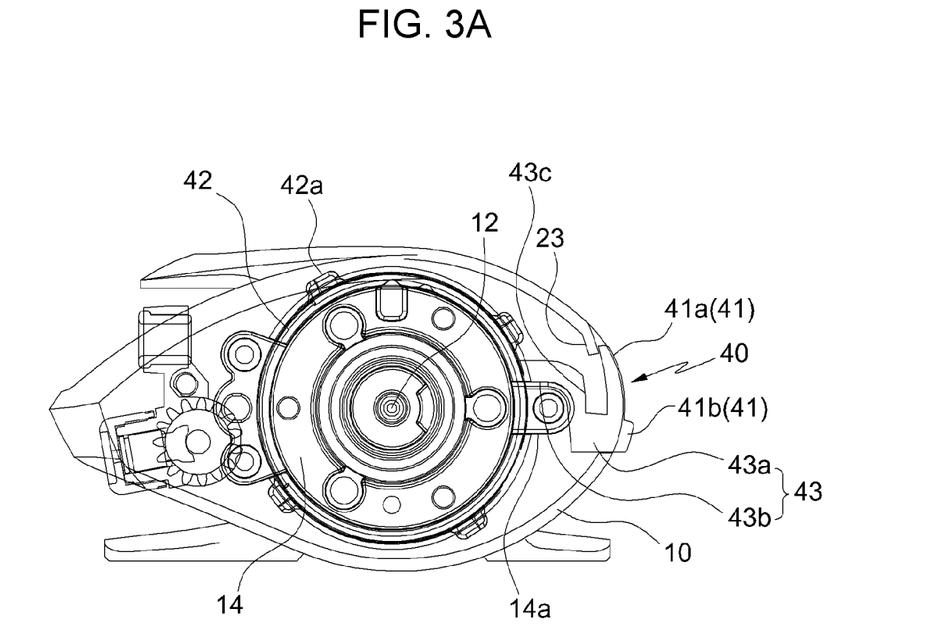
FIGS. 3A and 3B are side views showing a second embodiment of the present invention.
Figure 3B:
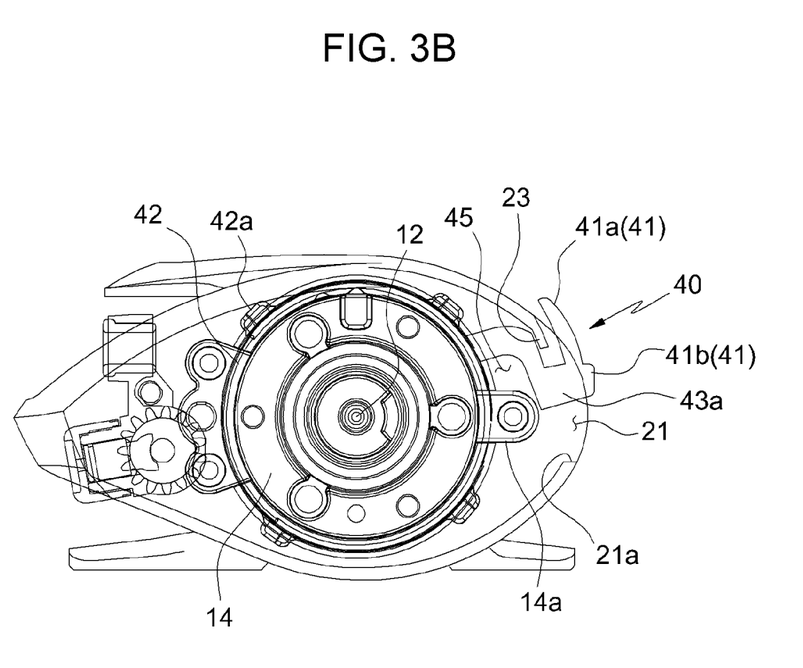

In the bridge 43, as shown in FIGS. 2A and 2B, the outer end 43a and the inner end 43b may be curvedly connected, or as shown in FIGS. 3A and 3B, the outer end 43a and the inner end 43b may be connected straight.

In this case, since the lower end of the protruding portion 41a is locked and supported by the lower inner side 21a of the first hole 21b, the lock lever 40 is stopped and supported by a double structure including the locking structure by the locking portion 45 and the bolt coupling portion 14a, so the lock lever 40 can be more stably maintained in the locked state.

Furthermore, a fitting groove 44 is formed between the protruding portion 41a and the bridge 43 by the bridge 43. The first side cover 20 has a fitting end 23 extending at a predetermined angle forward and inward from the upper inner side 43b of the first hole 21.

When the lock lever 40 is unlocked, the fitting end 23 is inserted into the fitting groove 44.

As shown in FIGS. 2A and 2B, if the fitting end 23 and the fitting groove 44 have the same width, when the lock lever 40 is unlocked, the lock lever 40 is guided and stopped by the fitting end 23 and the fitting groove 44 that are fitted to each other. Further, the lock lever 40 is maintained in the unlocked state by forcible fitting of the fitting end 23 and the fitting groove 44.

Furthermore, as shown in FIGS. 3A to 4B, the fitting groove 44 may be formed wider than the fitting end 23 and the fitting end 23 may be elongated at an angle to come in contact with the outer side of the straight portion of the bridge 43 (see FIGS. 3A and 3B).

Alternatively, the fitting end 23 may be elongated at an angle to come in contact with the inner side of the protruding portion 41a.

In these cases, since the fitting end 23 is in contact with the outer side of the straight portion of the bridge 43 or the inner side of the protruding portion 41a, the lock lever 40 can be guided when it is rotated forward and backward.

The lock lever 40 is stopped when it is rotated in the unlocking direction by the contact between the first side cover 20 and the inner side 43b of the bridge 43, as shown in FIGS. 3A and 3B, or by the contact between the fitting end 23 and the outer end 43a of the bridge 43, as shown in FIGS. 4A and 4B.

Although a fishing reel having a hidden lock lever for a palm-side first side cover having a specific shape and structure was described above with reference to the accompanying drawings, the present invention may be changed, modified, and replaced in various ways by those skilled in the art, and the change, modification, and replacement should be construed as being included in the protective range of the present invention.

What is claimed is:

1. A fishing reel comprising:
    a frame on which a spool is mounted;
    a first side cover coupled to a palm-side mount of the frame, a first end of a shaft of the spool being fitted in the first side cover;
    a second side cover coupled to a gear-side mount of the frame, a second end of the shaft of the spool being fitted in the second side cover; and
    a lock lever locking and unlocking the first side cover such that the first side cover can be attached to and detached from the frame,
    wherein the lock lever comprises:
    a ring covering a spool cover inside the first side cover and being rotatable in a circumferential direction of the spool;
    a locking protrusion that protrudes out of the ring and is selectively locked into or unlocked out of locking grooves of the frame as the ring is rotated forwardly and backwardly according to forward and backward rotation of the lock lever; and
    an operating member connected to the ring so as to be rotatable forwardly and backwardly, and protruding out of and hiding inside the first side over, and
    wherein the operating member protrudes out of the first side cover when the first side cover is unlocked, and the operating member hides inside the first side cover when the first side cover is locked.

2. The fishing reel according to claim 1, wherein the operating member comprises:
    a protruding portion that protrudes out of the first side cover when the first side cover is unlocked and that hides inside the first side cover when the first side cover is locked; and
    an operating portion operating the lock lever in locking and unlocking directions.

3. The fishing reel according to claim 2, wherein the first side cover (20) is formed in an elliptical shape with the sides elongated forward and backward,
    the lock lever has a bridge having an outer end connected to the protruding portion and an inner end connected to the ring,
    the protruding portion is smoothly curved upward and forward from the outer end of the bridge to have a curvature the same as that of the first side cover and a shape corresponding to a first hole, and
    when the lock lever is locked, the protruding portion closes the first hole inside the first hole and forms a portion of the outer side of the first side cover without protruding, and when the lock lever is unlocked, the protruding portion is rotated and naturally protrudes out of the first side cover.

4. The fishing reel according to claim 3, wherein the outer end of the bridge is biased more than the inner end in the locking direction of the lock lever, so the outer end and the inner end are not arranged in parallel in the same line, so a locking portion is formed between the bottoms of the outer end and the inner end, and
    when the lock lever is locked, a bolt coupling portion fixing the spool cover is locked inside the locking portion, so the lock lever is stopped and supported.

* * * * *